United States Patent
Kennett et al.

(10) Patent No.: US 10,487,934 B2
(45) Date of Patent: Nov. 26, 2019

(54) SYSTEMS AND METHODS FOR IMPLEMENTING ROBUST GEARBOX HOUSINGS

(71) Applicant: California Institute of Technology, Pasadena, CA (US)

(72) Inventors: Andrew Kennett, Montrose, CA (US); Douglas C. Hofmann, Altadena, CA (US); John Paul C. Borgonia, Santa Fe Springs, CA (US)

(73) Assignee: California Institute of Technology, Pasadena, CA (US)

(*) Notice: Subject to any disclaimer, the term of this patent is extended or adjusted under 35 U.S.C. 154(b) by 221 days.

(21) Appl. No.: 14/971,848

(22) Filed: Dec. 16, 2015

(65) Prior Publication Data

US 2016/0178047 A1    Jun. 23, 2016

Related U.S. Application Data

(60) Provisional application No. 62/093,348, filed on Dec. 17, 2014.

(51) Int. Cl.
*F16H 57/032*  (2012.01)
*B22D 29/00*  (2006.01)
(Continued)

(52) U.S. Cl.
CPC ........... *F16H 57/032* (2013.01); *B22C 9/101* (2013.01); *B22D 15/00* (2013.01); *B22D 21/005* (2013.01);
(Continued)

(58) Field of Classification Search
CPC ................ B23P 15/14; F02F 2200/06; F16H 2057/02078; F16H 57/032; B22D 21/005;
(Continued)

(56) References Cited

U.S. PATENT DOCUMENTS

| | | |
|---|---|---|
| 3,435,512 A | 4/1969 | Macrobbie |
| 3,529,457 A | 9/1970 | Bowers |

(Continued)

FOREIGN PATENT DOCUMENTS

| | | |
|---|---|---|
| CN | 101709773 A | 5/2010 |
| CN | 102563006 A | 7/2012 |

(Continued)

OTHER PUBLICATIONS

Davis, "Hardness/Strength Ratio of Metallic Glasses", Scripta Metallurgica, Feb. 18, 1975, vol. 9, pp. 431-436.

(Continued)

*Primary Examiner* — Christopher J Besler
(74) *Attorney, Agent, or Firm* — KPPB LLP

(57) ABSTRACT

Systems and methods in accordance with embodiments of the invention efficaciously implement robust gearbox housings. In one embodiment, a method of fabricating a gearbox housing includes: providing an alloy composition from which the gearbox housing will be fabricated from; casting the alloy composition around a solid body so as to form a part characterized by the inclusion of a cavity, where the cast part includes a metallic glass-based material; and nondestructively separating the cast part from the solid body.

13 Claims, 10 Drawing Sheets

(51) Int. Cl.
*B22D 21/00* (2006.01)
*B22C 9/10* (2006.01)
*B22D 25/06* (2006.01)
*F16H 57/02* (2012.01)
*B22D 15/00* (2006.01)
*B23H 7/02* (2006.01)

(52) U.S. Cl.
CPC ........... *B22D 25/06* (2013.01); *B22D 29/001*
(2013.01); *B23H 7/02* (2013.01); *F16H 2057/02078* (2013.01)

(58) Field of Classification Search
CPC .... B22D 21/007; B22D 29/00; B22D 29/001;
B22D 25/06; B22C 9/10; B22C 9/101;
B22C 9/108
See application file for complete search history.

(56) References Cited

U.S. PATENT DOCUMENTS

| | | | |
|---|---|---|---|
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk |
| 4,173,393 A | 11/1979 | Maurer |
| 4,202,404 A | 5/1980 | Carlson |
| 4,711,795 A | 12/1987 | Takeuchi et al. |
| 4,749,625 A | 6/1988 | Obayashi et al. |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,168,918 A | 12/1992 | Okuda et al. |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 6,162,130 A | 12/2000 | Masumoto et al. |
| 6,273,322 B1 | 8/2001 | Yamamoto et al. |
| 6,620,264 B2 * | 9/2003 | Kundig .................. B22D 15/00 148/538 |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,552,664 B2 | 6/2009 | Bulatowicz |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,789,629 B2 | 7/2014 | Parness et al. |
| 8,986,469 B2 | 3/2015 | Khalifa et al. |
| 9,057,120 B2 | 6/2015 | Pham et al. |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0062811 A1 | 4/2003 | Peker et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0127139 A1 | 6/2005 | Slattery et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2008/0085368 A1 | 4/2008 | Gauthier et al. |
| 2008/0121316 A1 | 5/2008 | Duan et al. |
| 2009/0011846 A1 | 1/2009 | Scott |
| 2009/0114317 A1 | 5/2009 | Collier et al. |
| 2009/0194205 A1 | 8/2009 | Loffler et al. |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0289946 A1 | 11/2012 | Steger |
| 2013/0062134 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0083640 A1 | 3/2014 | Waniuk et al. |
| 2014/0093674 A1 | 4/2014 | Hofmann et al. |
| 2014/0141164 A1 | 5/2014 | Hofmann et al. |
| 2014/0202595 A1 | 7/2014 | Hofmann |
| 2014/0213384 A1 | 7/2014 | Johnson et al. |
| 2014/0224050 A1 | 8/2014 | Hofmann et al. |
| 2014/0227125 A1 | 8/2014 | Hofmann et al. |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0342179 A1 | 11/2014 | Hofmann et al. |
| 2014/0348571 A1 | 11/2014 | Prest et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0289605 A1 | 10/2015 | Prest et al. |
| 2015/0298443 A1 | 10/2015 | Hundley et al. |
| 2015/0314566 A1 | 11/2015 | Mattlin et al. |
| 2016/0186850 A1 | 6/2016 | Hofmann et al. |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361897 A1 | 12/2016 | Hofmann et al. |
| 2017/0121799 A1 | 5/2017 | Hofmann et al. |
| 2017/0137955 A1 | 5/2017 | Hofmann et al. |
| 2018/0119259 A1 | 5/2018 | Hofmann et al. |
| 2019/0126674 A1 | 5/2019 | Parness et al. |
| 2019/0154130 A1 | 5/2019 | Hofmann et al. |

FOREIGN PATENT DOCUMENTS

| | | |
|---|---|---|
| CN | 103153502 A | 6/2013 |
| DE | 102010062089 A1 | 5/2012 |

(56) References Cited

FOREIGN PATENT DOCUMENTS

| | | |
|---|---|---|
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| JP | 61276762 A | 12/1986 |
| JP | 09121094 A | 5/1997 |
| JP | 2002045960 A | 2/2002 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 2013238278 A | 11/2013 |
| WO | 2007038882 A1 | 4/2007 |
| WO | 2008156889 A2 | 12/2008 |
| WO | 2011159596 A1 | 12/2011 |
| WO | 2012031022 A2 | 3/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |

OTHER PUBLICATIONS

De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, 528. pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.
Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Ha et al., "Tensile deformation behavior of two Ti-based amorphous matrix composites containing ductile β dendrites", Materials Science and Engineering: A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.
Hays, C. C., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.
Hofmann, "Shape Memory Bulk Metallic Glass Composites", Science, Sep. 10, 2010, vol. 329, pp. 1294-1295.
Hofmann, D. C., "Development of tough, low-density titanium-based bulk metallic glass matrix composites with tensile ductility", PNAS, Dec. 23, 2008, vol. 105, pp. 20136-20140.
Hofmann et al., "Designing metallic glass matrix composites with high toughness and tensile ductility", Nature Letters, Feb. 28, 2008, vol. 451, pp. 1085-1090.
Hofmann et al., Improving Ductility in Nanostructured Materials and Metallic Glasses: "Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
Hu et al., "Crystallization Kinetics of the $Cu_{47.5}Zr_{74.5}Al_5$ Bulk Metallic Glass under Continuous and Iso-thermal heating", App. Mech. and Materials, vols. 99-100, Sep. 8, 2011, p. 1052-1058.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.
Huang et al., "Fretting wear behavior of bulk amorphous steel", Intermetallics, Jun. 12, 2011, vol. 19, pp. 1385-1389.
Inoue et al., "Cobalt-based bulk glassy alloy with ultrahigh strength and soft magnetic properties", Nature Materials, Sep. 21, 2003, vol. 2, pp. 661-663.
Inoue et al., "Development and applications of late transition metal bulk metallic glasses", Bulk Metallic Glasses, pp. 1-25, 2008.
Inoue et al., "Developments and applications of bulk metallic glasses", Rev. Adv. Mater. Sci., Feb. 28, 2008, vol. 18, No. 1., pp. 1-9.
Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267.
Ishida et al., "Wear resistivity of super-precision microgear made of Ni-based metallic glass", Materials Science and Engineering, Mar. 25, 2007, vol. A449-451, pp. 149-154.

(56) References Cited

OTHER PUBLICATIONS

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim, Junghwan et al., "Oxidation and crystallization mechanisms in plasma-sprayed Cu-based bulk metallic glass coatings", Acta Materialia., Feb. 1, 2010, vol. 58, pp. 952-962.
Kim et al., "Amorphous phase formation of Zr-based alloy coating by HVOF spraying process", Journal of Materials Science, Jan. 1, 2001, vol. 36, pp. 49-54.
Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307.
Kim et al., "Weldability of $Cu_{54}Zr_{22}Ti_{18}Ni_6$ bulk metallic glass by ultrasonic welding processing", Materials Letters, May 17, 2014, 130, pp. 160-163.
Kobayashi et al., "Fe-based metallic glass coatings produced by smart plasma spraying process", Materials Science and Engineering, Feb. 25, 2008, vol. B148, pp. 110-113.
Kobayashi et al., "Mechanical property of Fe-base metallic glass coating formed by gas tunnel type plasma spraying", ScienceDirect, Surface & Coatings Technology, Mar. 14, 2008, 6 pgs.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158.
Kozachkov et al., "Effect of cooling rate on the volume fraction of B2 phases in a CuZrAlCo metallic glass matrix composite", Intermetallics, Apr. 19, 2013, vol. 39, pp. 89-93.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476.
Kwon et al., "Wear behavior of Fe-based bulk metallic glass composites", Journal of Alloys and Compounds, Jul. 14, 2011, vol. 509S, pp. S105-S108.
Launey et al., "Fracture toughness and crack-resistance curve behavior in metallic glass-matrix composites", Applied Physics Letters, Jun. 18, 2009, vol. 94, pp. 241910-1-241910-3.
Launey et al., "Solution to the problem of the poor cyclic fatigue resistance of bulk metallic glasses", PNAS Early Edition, pp. 1-6, Jan. 22, 2009.
Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.
Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs., Jul. 1, 2008.
List, A. et al., "Impact Conditions for Cold Spraying of Hard Metallic Glasses", Journal of Thermal Spray Technology, Jun. 1, 2012, vol. 21, No. 3-4, pp. 531-540.
Liu, X. Q., "Microstructure and properties of Fe-based amorphous metallic coating produced by high velocity axial plasma spraying", Science Direct, Journal of Alloys and Compounds, Apr. 23, 2009, vol. 484, pp. 300-307.
Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.
Liu et al., "Metallic glass coating on metals plate by adjusted explosive welding technique", Applied Surface Science, Jul. 16, 2009, vol. 255, pp. 9343-9347.
Liu et al., "Sliding Tribological Characteristics of a Zr-based Bulk Metallic Glass Near the Glass Transition Temperature", Tribol. Lett., Jan. 29, 2009, vol. 33, pp. 205-210.
Liu et al., "Wear behavior of a Zr-based bulk metallic glass and its composites", Journal of Alloys and Compounds, May 5, 2010, vol. 503, pp. 138-144.
Lupoi, R. et al., "Deposition of metallic coatings on polymer surfaces using cold spray", Science Direct, Surface & Coatings Technology, Sep. 6, 2010, vol. 205, pp. 2167-2173.
Ma et al., "Wear resistance of Zr-based bulk metallic glass applied in bearing rollers", Materials Science and Engineering, May 4, 2004, vol. A386, pp. 326-330.
Maddala et al., "Effect of notch toughness and hardness on sliding wear of Cu50Hf41.5A18.5 bulk metallic glass", Scripta Materialia, Jul. 6, 2011, vol. 65, pp. 630-633.
Narayan et al., "On the hardness and elastic modulus of bulk metallic glass matrix composites", Scripta Materialia, Jun. 9, 2010, vol. 63, Issue 7, pp. 768-771.
Ni et al., "High performance amorphous steel coating prepared by HVOF thermal spraying", Journal of Alloys and Compounds, Jan. 7, 2009, vol. 467, pp. 163-167, Nov. 29, 2007.
Nishiyama, N. et al., "Recent progress of bulk metallic glasses for strain-sensing devices", Materials Science and Engineering: A, vols. 449-451, Mar. 25, 2007, 79-83.
Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.
Parlar et al., "Sliding tribological characteristics of Zr-based bulk metallic glass", Intermetallics, Jan. 2008, vol. 16, pp. 34-41.
Pauly et al., "Modeling deformation behavior of Cu—Zr—Al bulk metallic glass matrix composites", Applied Physics Letters, Sep. 2009, vol. 95, pp. 101906-1-101906-3.
Pauly et al., "Transformation-mediated ductility in CuZr-based bulk metallic glasses", Nature Materials, May 16, 2010, vol. 9, Issue 6, pp. 473-477.
Ponnambalam, et al., "Fe-based bulk metallic glasses with diameter thickness larger than one centimeter", J Mater Res, Feb. 17, 2004. vol. 19; pp. 1320-1323.
Porter et al., "Incorporation of Amorphous Metals into MEMS for High Performance and Reliability", Rockwell Scientific Company, Final Report, Nov. 1, 2003, 41 pgs.
Prakash et al., "Sliding wear behavior of some Fe-, Co-and Ni-based metallic glasses during rubbing against bearing steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.

(56) References Cited

OTHER PUBLICATIONS

Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of $Cu_{60}Zr_{30}Ti_{10}$ bulk metallic glass", Materials Science and Engineering, Apr. 1, 2004, vol. A384 pp. 138-142.
Tan et al., "Synthesis of La-based in-situ bulk metallic glass matrix composite", Intermetallics, Nov. 2002, vol. 10, Issues 11-12, pp. 1203-1205.
Tao et al., "Effect of rotational sliding velocity on surface friction and wear behavior in Zr-based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr-based bulk-metallic glasses and their composites", Intermetallics, Mar. 6, 2009, vol. 17, pp. 579-590.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al., "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, vol. 26, No. 10, May 28, 2011; abstract; p. 1263, paragraphs 2-3; p. 1265, col. 2, paragraph 2.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, pp. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
Extended European Search Report for European Application No. 14889035.3, Search completed Dec. 4, 2017, dated Dec. 13, 2017, 10 Pgs.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.

(56) References Cited

OTHER PUBLICATIONS

"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., vol. 24, No. 12, pp. 3611-3619, Dec. 2009.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.
Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.
Cheng, J. B., "Characterization of mechanical properties of FeCrBSiMn-NbY metallic glass coatings", J Mater Sci., Apr. 16, 2009, vol. 44, pp. 3356-3363.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430.
Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.
Conner et al., "Shear band spacing under bending of Zr-based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, Jan. 20, 2006, vol. 54, pp. 1403-1408.
Sanders et al., "Stability of Al-rich glasses in the Al—La—Ni system", 2006, Intermetallics, 14, pp. 348-351.
Sun et al., "Fiber metallic glass laminates", Dec. 2010, J. Mater. Res., vol. 25, No. 12, pp. 2287-2291.
Kim et al., "Design and synthesis of Cu-based metallic glass alloys with high glass forming ability", Journal of Metastable and Nanocrystalline Materials, Sep. 1, 2005, vols. 24-25, pp. 93-96.

\* cited by examiner

COMPRESSED AIR USED TO COOL AND SHRINK THE SOLID BODY

CAST PART (INCLUDING FLASHING)

SOLID BODY INCLUDING PATTERNING FOR GEAR TEETH

CAST PART

INTERNAL PLANETARY GEARING COMPONENTS

SYSTEMS AND METHODS FOR IMPLEMENTING ROBUST GEARBOX HOUSINGS

CROSS-REFERENCE TO RELATED APPLICATIONS

The current application claims priority to U.S. Provisional Application No. 62/093,348, filed Dec. 17, 2014, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. § 202) in which the Contractor has elected to retain title.

FIELD OF THE INVENTION

The present invention generally relates to gearboxes.

BACKGROUND

Gearboxes are mechanisms that typically function to transfer energy from an input to an output, generally using an included set of interlocking gears. In many instances, gearboxes operate to alter input/output speed (e.g. rotational speed) and/or torque. Gearboxes can also be used to change the direction of energy transfer. For example, wind turbines often include gearboxes. The blades of a wind turbine generally move at a very slow rate of rotation, but with a great deal of torque. Accordingly, the gearbox of a wind turbine can function to translate this motion into the faster rotational speed (and correspondingly reduced torque) of the electricity generator.

SUMMARY OF THE INVENTION

Systems and methods in accordance with embodiments of the invention efficaciously implement robust gearbox housings. In one embodiment, a method of fabricating a gearbox housing includes: providing an alloy composition from which the gearbox housing will be fabricated from; casting the alloy composition around a solid body so as to form a part characterized by the inclusion of a cavity, where the cast part includes a metallic glass-based material; and nondestructively separating the cast part from the solid body.

In another embodiment, the cast part is further characterized by its inclusion of gear teeth disposed around the lining of the cavity.

In yet another embodiment, the method further includes implementing gear teeth onto the lining of the cavity.

In still another embodiment, the implementing of gear teeth is achieved via machining.

In still yet another embodiment, the machining is achieved via electron discharge machining.

In a further embodiment, the alloy composition is based on one of: Ti, Zr, Cu, Ni, Fe, Pd, Pt, Ag, Au, Al, Hf, W, Be, and combinations thereof.

In a yet further embodiment, the alloy composition is based on Titanium.

In a still further embodiment, the cast part includes metallic glass-based material throughout its structure.

In a still yet further embodiment, the casting of the alloy composition results in a solidification shrinkage of less than approximately 1.5%.

In another embodiment, the solid body is cylindrical in shape.

In still another embodiment, the solid body includes a crystalline metal.

In yet another embodiment, the solid body is entirely made of a crystalline metal.

In still yet another embodiment, the crystalline metal is brass.

In a further embodiment, the solid body is characterized by a coefficient of thermal expansion that is greater than the coefficient of thermal expansion for the cast part by at least approximately 10% at temperatures below approximately 24° C.

In a yet further embodiment, nondestructively removing the cast part from the solid body includes cooling the solid body such that it shrinks to a greater extent than any corresponding shrinkage experienced by the cast part, and thereby separating the solid body from the cast part.

In a still further embodiment, the cast part is cup-shaped.

In a still yet further embodiment, the cast part is characterized by a density of less than approximately 5.5 g/cm$^3$.

In another embodiment, the cast part is characterized by a Young's modulus of less than approximately 110 GPa.

In yet another embodiment, the cast part is characterized by a Rockwell C hardness of greater than approximately 45.

In still another embodiment, the cast part is characterized by an elastic limit of greater than approximately 1%.

In still yet another embodiment, the cast part is characterized by a fracture toughness of between approximately 20 MPa m$^{1/2}$ and approximately 200 MPa m$^{1/2}$.

In a further embodiment, a gearbox housing includes a metallic glass-based material.

In a yet further embodiment, the metallic glass-based material is present throughout the structure of the gearbox housing.

In a still further embodiment, the gearbox housing is characterized by its inclusion of a cavity, and gearing teeth disposed around the perimeter of the cavity.

In a still yet further embodiment, the metallic glass-based material includes one of Ti, Zr, Cu, Ni, Fe, Pd, Pt, Ag, Au, Al, Hf, W, Be, and combinations thereof.

In another embodiment, the gearbox housing is characterized by a density of less than approximately 5.5 g/cm$^3$.

In yet another embodiment, the gearbox housing is characterized by a Young's modulus of less than approximately 110 GPa.

In still another embodiment, the gearbox housing is characterized by a Rockwell C hardness of greater than approximately 45.

In still yet another embodiment, the gearbox housing is characterized by an elastic limit of greater than approximately 1%.

In a further embodiment, the gearbox housing is characterized by a fracture toughness of between approximately 20 MPa m$^{1/2}$ and approximately 200 MPa m$^{1/2}$.

DETAILED DESCRIPTION

Turning now to the drawings, systems and methods for efficaciously implementing robust gearbox housings in accordance with certain embodiments of the invention are illustrated. In many embodiments, systems and methods are directed to implementing a gearbox housing that defines the annular ring of a planetary gear system. A planetary gear system generally consists of two gears mounted so that the center of one gear—typically referred to as 'the planet gear'—revolves around the center of the other gear—typically referred to as 'the sun gear.' As alluded to above, a planetary gear train also typically includes an 'outer gear ring'—sometimes referred to as an 'annular ring'; in addition to generally being engaged with the sun gear, the planet gear is also typically engaged with the inner circumference of the annular ring. Hence, the planet gear traces the inner circumference of the annular ring as it rotates about the sun gear.

Figure 1:
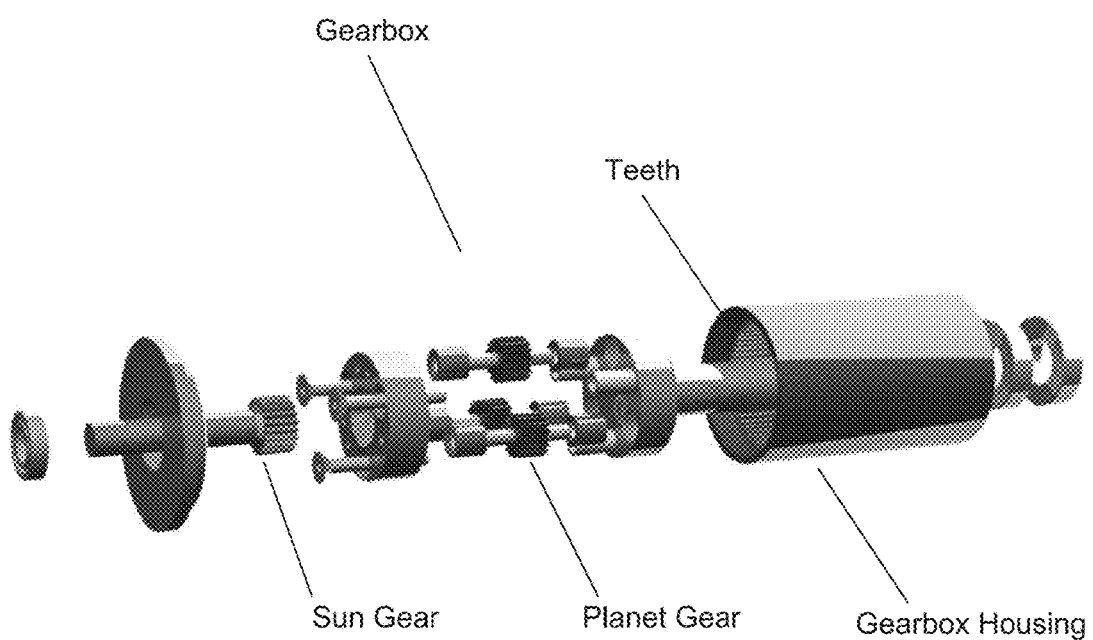
FIG. 1 illustrates a gearbox housing that can be manufactured in accordance with certain embodiments of the invention.

For context, FIG. 1 illustrates a gearbox housing that can be implemented in accordance with certain embodiments of the invention. In particular, a gearbox is depicted, which includes a constituent sun gear, and constituent planetary gears. Note that it is depicted that gearbox housing includes teeth, and thereby defines the annular ring of the corresponding planetary gear system. In many embodiments of the invention, the gearbox housing and the constituent teeth in combination are characterized by a homogenous material composition. In other words, the housing and the teeth are made from the same material. In this way, the gearbox housing including its constituent teeth can be said to be 'unibody.' As can be appreciated, having such a seamless structure can be advantageous in a number of respects, including from a fracture mechanics perspective.

While gearbox housings are typically machined out of conventional engineering metals, e.g. steel, it can be useful to fabricate gearbox housings out of more durable, wear-resistant materials, like metallic glass-based materials. Metallic glasses, also known as amorphous alloys, embody a relatively new class of materials that is receiving much interest from the engineering and design communities. Metallic glasses are characterized by their disordered atomic-scale structure in spite of their metallic constituent elements—i.e. whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, metallic glass materials lend themselves to relatively easy processing in certain respects. For example, the forming of metallic glass materials can be compatible with injection molding processes. Thus, for example, metallic glass compositions can be cast into desired shapes.

Nonetheless, the practical implementation of metallic glasses presents certain challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g. on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g. greater than 1 mm). These metallic glass compositions that can be made to be thicker are known as 'bulk metallic glasses' ("BMGs"). As can be appreciated, such BMGs can be better suited for investment molding operations.

In addition to the development of BMGs, 'bulk metallic glass matrix composites' (BMGMCs) have also been developed. BMGMCs are characterized in that they possess the amorphous structure of BMGs, but they also include crystalline phases of material within the matrix of amorphous structure. For example, the crystalline phases can exist in the form of dendrites. The crystalline phase inclusions can impart a host of favorable materials properties on the bulk material. For example, the crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

The potential of metallic glass-based materials continues to be explored, and developments continue to emerge. For example, in U.S. patent application Ser. No. 13/928,109, D. Hofmann et al. disclose the implementation of metallic glass-based materials in macroscale gears. The disclosure of U.S. patent application Ser. No. 13/928,109 is hereby incorporated by reference in its entirety, especially as it pertains to metallic glass-based materials, and their implementation in macroscale gears. Likewise, in U.S. patent application Ser. No. 13/942,932, D. Hofmann et al. disclose the implementation of metallic glass-based materials in macroscale compliant mechanisms. The disclosure of U.S. patent application Ser. No. 13/942,932 is hereby incorporated by reference in its entirety, especially as it pertains to metallic glass-based materials, and their implementation in macroscale compliant mechanisms. Moreover, in U.S. patent application Ser. No. 14/060,478, D. Hofmann et al. disclose techniques for depositing layers of metallic glass-based materials to form objects. The disclosure of U.S. patent application Ser. No. 14/060,478 is hereby incorporated by reference especially as it pertains to metallic glass-based materials, and techniques for depositing them to form objects. Furthermore, in U.S. patent application Ser. No. 14/163,936, D. Hofmann et al., disclose techniques for additively manufacturing objects so that they include metallic glass-based materials. The disclosure of U.S. patent application Ser. No. 14/163,936 is hereby incorporated by reference in its entirety, especially as it pertains to metallic glass-based materials, and additive manufacturing techniques for manufacturing objects so that they include metallic glass-based materials. Additionally, in U.S. patent application Ser. No. 14/177,608, D. Hofmann et al. disclose techniques for fabricating strain wave gears using metallic glass-based materials. The disclosure of U.S. patent application Ser. No. 14/177,608 is hereby incorporated by reference in its entirety, especially as it pertains to metallic glass-based materials, and their implementation in strain wave gears. Moreover, in U.S. patent application Ser. No. 14/178,098, D. Hofmann et al., disclose selectively developing equilibrium inclusions within an object constituted from a metallic glass-based material. The disclosure of U.S. patent application Ser. No. 14/178,098 is hereby incorporated by reference, especially as it pertains to metallic glass-based materials, and the tailored development of equilibrium inclusions within them. Furthermore, in U.S. patent application Ser. No. 14/252,585, D. Hofmann et al. disclose techniques for shaping sheet materials that include metallic glass-based materials. The disclosure of U.S. patent application Ser. No. 14/252,585 is hereby incorporated by reference in its entirety, especially as it pertains to metallic glass-based materials and techniques for shaping sheet materials that include metallic glass-based materials. Additionally, in U.S. patent application Ser. No. 14/259,608, D. Hofmann et al. disclose techniques for fabricating structures including metallic glass-based materials using ultrasonic welding. The disclosure of U.S. patent application Ser. No. 14/259,608 is hereby incorporated by reference in its entirety, especially as it pertains to metallic glass-based materials and techniques for fabricating structures including metallic glass-based materials using ultrasonic welding. Moreover, in U.S. patent application Ser. No. 14/491,618, D. Hofmann et al. disclose techniques for fabricating structures including metallic glass-based materials using low pressure casting. The disclosure of U.S. patent application Ser. No. 14/491,618 is hereby incorporated by reference in its entirety, especially as it pertains to metallic glass-based materials and techniques for fabricating structures including metallic glass-based materials using low pressure casting. Furthermore, in U.S. patent application Ser. No. 14/660,730, Hofmann et al. disclose metallic glass-based fiber metal laminates. The disclosure of U.S. patent application Ser. No. 14/660,730 is hereby incorporated by reference in its entirety, especially as it pertains to metallic glass-based fiber metal laminates.

Notwithstanding all of these developments, the vast potential of metallic glass-based materials has yet to be fully appreciated. For instance, while metallic glass-based materials are often cast into mold cavities, the notion of casting metallic glass-based materials around a solid body to form useful objects has not yet been fully explored. Notably, in the context of manufacturing gearbox housings, such a technique would be unconventional and counterintuitive. For example, as mentioned previously, gearbox housings are presently typically manufactured from conventional engineering materials, such as steel, and they are typically machined into their final form factor. Casting methodologies are not conventionally used for a number of reasons. For example, the most appropriate conventional materials for casting techniques are softer materials. Typically, materials suitable for casting generally have low melting temperatures and are soft. Conversely, materials with high melting temperatures are generally hard. However, in gearing applications, it is desirable that the constituent components be made from harder, wear-resistant, materials. By the nature of their operation, gearing components are often in intimate contact with one another and slide against each other, and it would thereby be counterproductive to manufacture gearing components from softer materials that are better suited for casting techniques.

Moreover, casting conventional molten material around a solid body presents other issues that must be accounted for. In particular, because of issues related to solidification shrinkage during crystallization, when a melt of a conventional, crystalline material solidifies in a casting context, it shrinks. Accordingly, casting a conventional material around a solid body will typically result in the solidified melt tightly conforming to the solid body to an extent that it would be difficult to remove the cast part from the solid body nondestructively. Accordingly, for these and other reasons, gearbox housings are generally not made by casting conventional, crystalline materials around a solid body. Steel, for example, which makes up the vast majority of gearbox components, cannot be cast readily into a housing due to both its high melting temperature and its large shrinkage upon cooling. Both features would damage a mold during casting and removal of the part from the mold.

Notwithstanding these conventional understandings, it has been surprisingly determined that casting a metallic glass-based material around a solid body to form a gearbox housing can be a viable manufacturing technique. Accordingly, many embodiments of the invention are directed to the implementation of metallic glass-based gearbox housings. Such gearbox housings can be advantageous in a number of respects including that they can offer outstanding mechanical properties (e.g. advantageous structural properties, and advantageous wear-resistance). Moreover, that they can be manufactured using casting methodologies can also be advantageous. Some of the reasons that underlie the viability of the disclosed manufacturing techniques include: metallic glass-based materials can have low melting temperatures and thus may not damage molds made from steel; they can be harder than steel when cast into a part; they can exhibit lower shrinkage when solidifying relative to typical crystalline metals; and they can exhibit a lower coefficient of thermal expansion than most crystalline metals. Methods for fabricating robust, metallic glass-based, gearbox housings in accordance with many embodiments of the invention are now discussed below.

Methods for Efficaciously Fabricating Robust Gearbox Housings

In many embodiments of the invention, robust metallic glass-based gearbox housings are implemented using tailored casting strategies. In many embodiments, a metallic glass-based material is cast around a solid body to form the overall housing geometry. As can be appreciated, an overall housing geometry for a gearbox housing can often be characterized as a solid body including a cavity, which can house any associated gearing components (e.g. gears, including sun gears and planet gears). For example, in many embodiments, a metallic glass-based material is cast around a solid body so as to form either a cup-shaped geometry or a cylindrical, hollow-tube, geometry, both of which can serve as the basis for the gearbox housing. As can be appreciated, a 'cup-shaped' geometry can be understood to be cylindrical in shape, being capped on one end by a disk. In the context of the instant application, the 'through hole' within a hollow tube geometry can be considered to be a cavity. In some instances, the cast part can be characterized as a frustum, such as a conic frustum. Of course, any suitable geometry can be implemented that includes a cavity, which can be used to house associated gearing components. In many instances, the cast part can be post-processed so as to form gear teeth on the inner lining of the cast part (in other words, around the perimeter of the cavity). For example, as alluded to above, in many instances, the gearbox housing defines the annular ring of a planetary gear system, and thereby includes internal gear teeth. Accordingly, in many instances, the cast metallic glass-based material is processed post-casting to implement the gear teeth of the annular ring.

Figure 2:
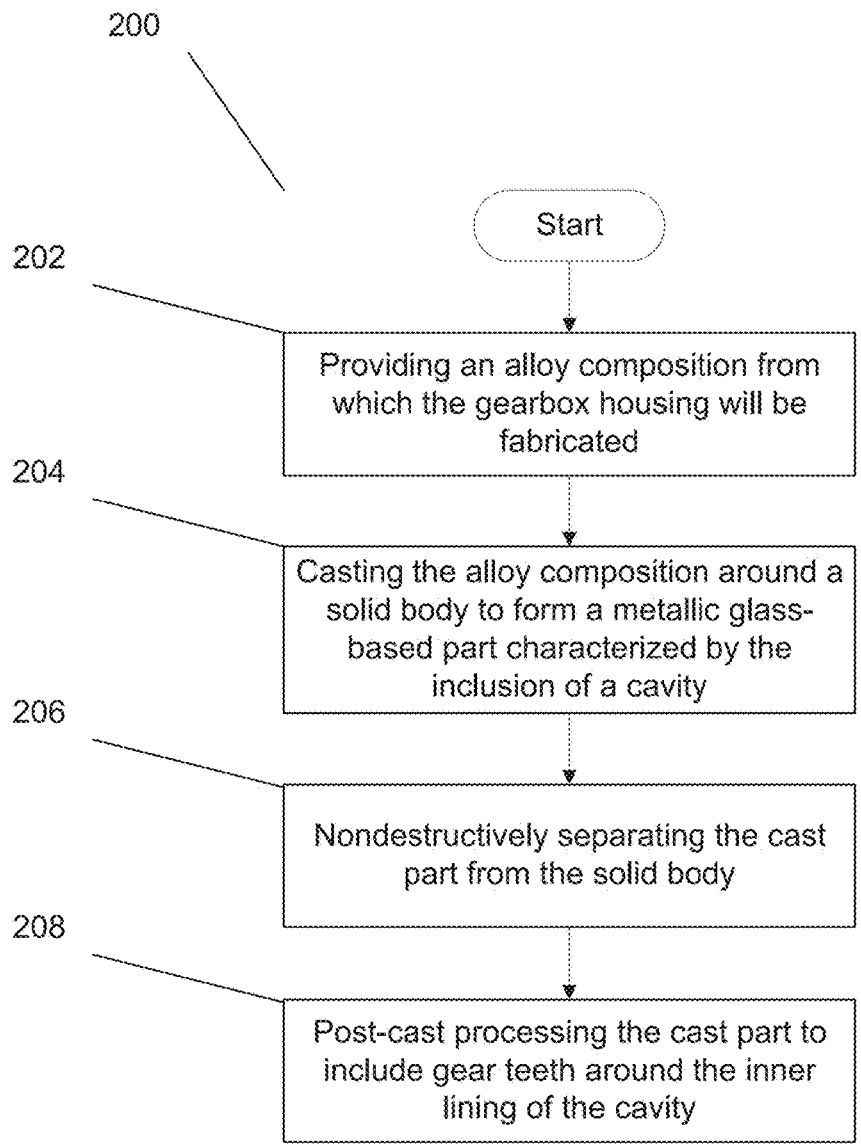
FIG. 2. Illustrates a method of manufacturing a gearbox housing in accordance with certain embodiments of the invention.

As one example, FIG. 2 illustrates a method of fabricating a robust gearbox housing that defines an annular ring of a planetary gear system that includes post-cast processing to implement gear teeth in accordance with certain embodiments of the invention. In particular, the method 200 includes providing 202 an alloy composition that the robust metallic glass-based gearbox housing will be fabricated from. More specifically, the alloy composition should be capable of forming a metallic glass-based material. For example, in many instances, the alloy composition is a composition that is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be and combinations thereof. In the instant context, the term 'based on' can be understood to mean that the specified element(s) are present in the greatest amount relative to any other present elements. In many instances, the provided alloy composition can form a metallic glass-based material using any of a variety of standard processing techniques. It should be clear that the illustrated method is meant to be general, and any suitable alloy composition that is capable of forming a metallic glass-based material can be implemented. For example, any of the metallic glass-based materials that can be found in the disclosures to Doug Hofmann et al. recited and incorporated by reference above can be implemented. In many embodiments, the selected alloy composition can possess a fracture toughness of between approximately 20 MPa m$^{1/2}$ and approximately 200 MPa m$^{1/2}$ when cast as a metallic glass-based material. In a number of embodiments, the selected alloy composition can possess a Young's modulus of less than approximately 110 GPa when cast as a metallic glass-based material. In a numerous embodiments, the selected alloy composition can possess a Rockwell C Harness value of greater than approximately 45 when cast as a metallic glass-based material. In a number of embodiments, the selected alloy composition can possess an elastic limit of greater than 1% when cast as a metallic glass-based material. As alluded to previously, metallic glass-based materials as a class of alloys generally exhibit relatively low melting temperature needed for casting, have high hardness in cast parts and have low solidification shrinkage due to their lack of crystallization. Although some metallic glass based materials may perform better than others in a gearbox application, the casting methodologies disclosed herein can be implemented using any metallic glass-based materials.

In many embodiments, the implemented alloy composition includes titanium in significant quantities. Notably, titanium has typically not been included in conventional gearbox housings, because its inclusion was not particularly compatible with conventional understandings and manufacturing methodologies. For example, the crystalline alloy Ti-6Al-4V is used widely in many engineering applications as an alternative to steel due to its higher strength and lower density, but it is not utilized widely—if at all—in gearing applications due to the general poor hardness and wear resistance of titanium-based alloys. Crystalline titanium alloys generally also have high melting temperatures and large solidification shrinkage, making them difficult to cast. In contrast, titanium-based metallic glass materials can be very hard and have low melting temperatures, making them suitable to the casting methodologies described herein. In numerous embodiments, the implemented alloy composition is characterized by a density of less than approximately 5.5 g/cm$^3$ in a solidified state. As can be appreciated, robust gearbox housings fabricated from such lightweight metallic glass-based materials can be advantageous in a number of applications. To be clear, any suitable metallic glass-based gear can be implemented. Moreover, as can be appreciated, the particularly implemented metallic glass-based material composition can be selected based on the anticipated operating conditions of the robust gearbox housing to be fabricated.

It is further illustrated that the method 200 further includes casting 204 the provided alloy composition around a solid body to form a metallic glass-based gearbox housing characterized by the inclusion of a cavity, which can serve to house any internal gearing components. Any suitable casting technique can be implemented in accordance with many embodiments of the invention. For example, the utilized casting technique can revolve around one of: injection molding, die casting, spin forming, thermoplastic forming, blow molding, spray forming, hydroforming, capacitive discharge forming, 3D printing, ultrasonic additive manufacturing, and combinations thereof. In many embodiments, the alloy composition is provided in the form of an ingot, an arc melter is used to melt the ingot, and suction pressure is used to conform the melt to the shape of the solid body.

Any suitable solid body can be used in accordance with embodiments of the invention, and the solid body can be made from any suitable material. For example, in many instances, the solid body can be in the form of a cylinder (and can be referred to as 'a cylindrical plug'). In some embodiments, the solid body is made out of brass; in a number of embodiments, the solid body is made out of steel. To be clear, the solid body can be made out of any suitable material in accordance with embodiments of the invention.

Importantly, as can be appreciated, in many embodiments, the alloy composition is cast such that the gearbox housing comprises a metallic glass-based material. In many embodiments, the cast gearbox housing is cast such that the gearbox housing includes metallic glass-based material in its entirety. Thus, in many embodiments, the cast part is cooled at a cooling rate that is high enough (e.g. above the 'critical cooling rate') to implement the desired amorphous nature.

In many instances, the part is cast such that it can be removed nondestructively from the solid body around which it is cast. Accordingly, the illustrated method further includes nondestructively separating 206 the cast part from the solid body. As alluded to above, this possibility largely derives from the distinct thermal shrinkage properties that metallic glass-based materials can possess. Whereas crystalline metals typically shrink substantially when being cooled in a casting context, amorphous alloys do not necessarily do so—e.g. metallic glass-based materials can shrink to a much lesser extent. Consequently, in many instances, cast metallic glass-based materials can be nondestructively removed from the solid bodies around which they are cast. For example, solidification that occurs when forming metallic glass-based materials can be between approximately 0 and 1%. By contrast, Table 1 lists solidification shrinkages that have been reported for conventional engineering materials.

TABLE 1

Reported Solidification Shrinkage Values
for Conventional Engineering Materials

| Metal | Percentage |
|---|---|
| Aluminum | 6.6 |
| Copper | 4.9 |
| Magnesium | 4.0 or 4.2 |
| Zinc | 3.7 or 6.5 |
| Low carbon steel | 2.5-3.0 |
| High carbon steel | 4 |
| White cast iron | 4.0-5.5 |
| Gray cast iron | −2.5-1.6 |
| Ductile cast iron | −4.5-2.7 |

To take advantage of this unique property, many embodiments of the invention cast metallic glass-based materials such that the solidification shrinkage that occurs is less than approximately 1.5%.

It should be noted that, within the context of the instant application, 'nondestructive' removal does not preclude normal wear and tear. As can be appreciated, the cast part will be in intimate contact with the solid body—accordingly, some wear and tear due to sliding removal may occur.

As alluded to previously, the nondestructive removal of the cast part can be aided by the generally low coefficient of thermal expansion of metallic glass-based materials, which can generally be between 8-10 1/° C. for many alloys. This lower shrinkage when cooled allows for easier removal of the casting plug. For instance, in some embodiments, compressed air is used to cool the solid body casting plug, thereby shrinking it (i.e. to a greater extent relative to any shrinking that the cast part may undergo), which can allow the cast part to be more easily removed. Accordingly, in many embodiments, the solid body is geometrically more reactive to a temperature drop than the cast part. For instance, in many embodiments, the solid body is characterized by a coefficient of thermal expansion that is at least approximately 10% greater than that of the cast part at temperatures below room temperature (e.g. 24° C.). In this way, cooling experienced by the solid body can shrink it to a greater extent relative to any shrinkage experienced by the cast part. While a certain relative value and a certain temperature is mentioned, any suitable metrics can be used to confirm that the solid body can be reduced in size to a greater extent than the cast part to facilitate removal. More generally, it should be appreciated that any suitable nondestructive extraction technique can be implemented in accordance with embodiments of the invention. In some instances, the cast part can be removed without the implementation of any adjunct methodologies.

It should also be noted that the alloy composition can be cast into any suitable dimensions. For instance, in many embodiments, gearbox housings are cast so as to approximate conventionally manufactured gearbox housings, such as those manufactured by MAXON MOTOR. In a number of embodiments, alloy composition is cast to result in a gearbox housing having a diameter of approximately 25 mm diameter. In several embodiments, the alloy composition is cast so that the gearbox housing has a length of between approximately 25 mm and approximately 40 mm. In many embodiments, the cast part is characterized by a wall thickness of approximately 2 mm. To be clear, although several dimensions are mentioned, the illustrated methodology is general and can be used to produce robust gearbox housings of any suitable dimensions in accordance with embodiments of the invention.

It is further illustrated that the method 200 additionally includes post-cast processing 208 the cast part so as to implement gear teeth around the perimeter of the cavity. In this way, the gearbox housing can define the annular ring of a planetary gearing system. Any suitable post-cast processing technique can be implemented in accordance with embodiments of the invention. For example, in many embodiments, electron discharge machining (EDM) is utilized to machine the desired gear teeth. To be clear though, any suitable post-cast processing technique can be used to implement the gear teeth of the robust gearbox housing in accordance with embodiments of the invention.

Figure 3A:
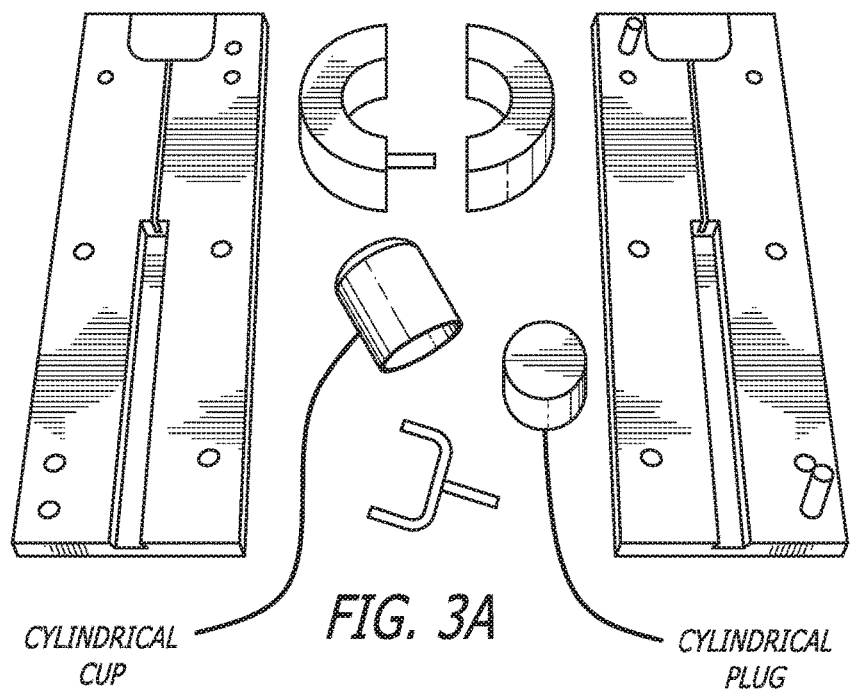
FIGS. 3A-3H illustrate the manufacture of a gearbox housing in accordance with certain embodiments of the invention.

FIGS. 3A-3I illustrate one implementation of the methodology illustrated in FIG. 2 in accordance with an embodiment of the invention. In particular, FIG. 3A illustrates a 5 piece split mold used to cast the pictured cylindrical cup that is the gearbox housing. More specifically, the cylindrical cup, and the cylindrical plug that the metallic glass-based composition was cast around are highlighted. In this particular instance, the cylindrical cup was fabricated from a Ti—Zr—Cu—Be alloy composition, an arc melter was used to melt the metallic glass-based composition, and suction pressure was used to force the melt around the plug so as to form the depicted cylindrical cup. Additionally in this particular instance, the cylindrical plug was made from brass. Utilizing a solid body that comprises brass can be advantageous insofar as brass components can be easy to manufacture, and brass can also have a high thermal expansion coefficient (e.g. >~20 1/° C.). Of course, to reiterate, the solid body can be made of any suitable material in accordance with embodiments of the invention.

Figure 3B:
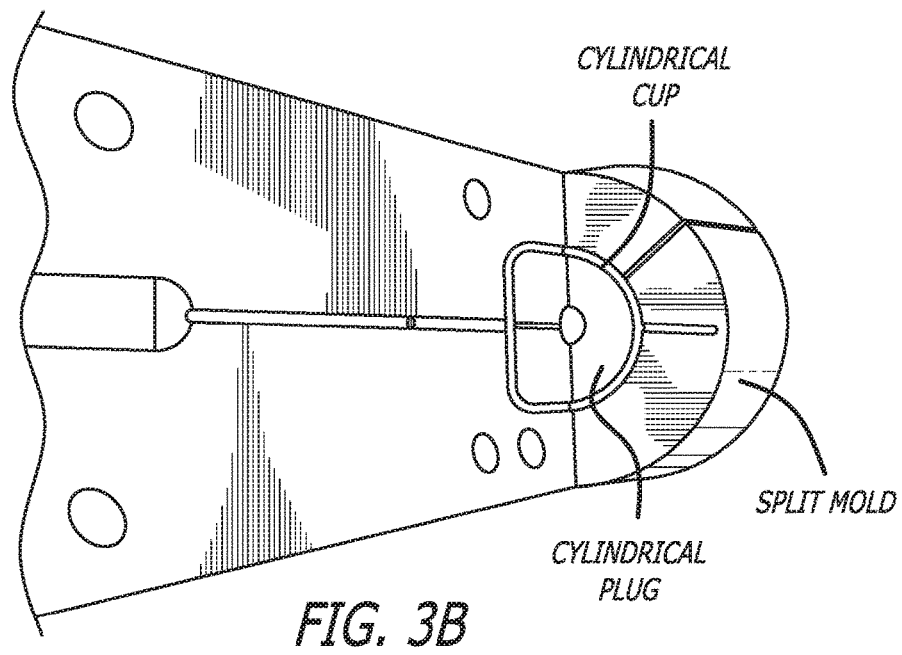
Figure 3C:
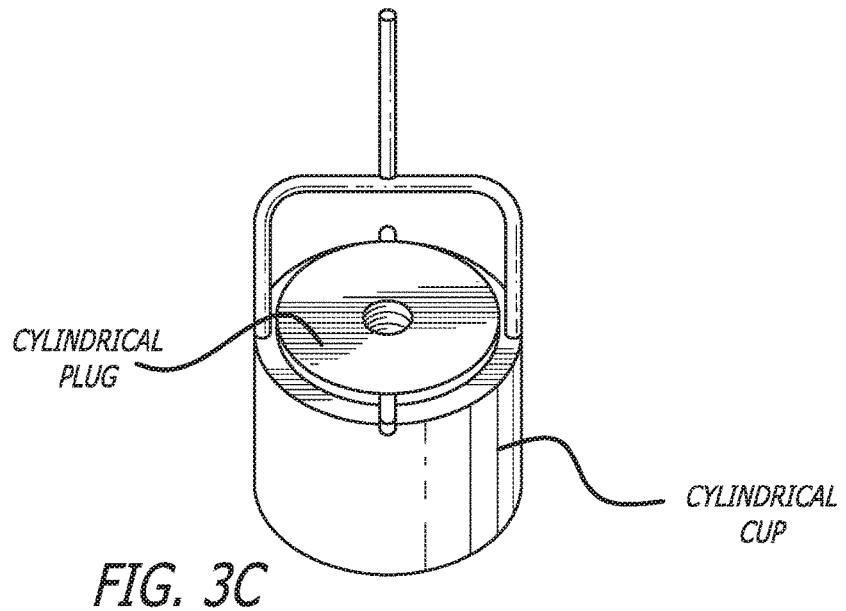

FIG. 3B depicts the cast cylindrical cup within the mold. In particular, it is depicted that the cup is suspended within the split mold pieces and the cylindrical plug. FIG. 3C illustrates the brass cylindrical plug within the cast cylindrical cup; in other words, the cylindrical cup has not yet been removed from the solid body cylindrical plug.

Figure 3D:
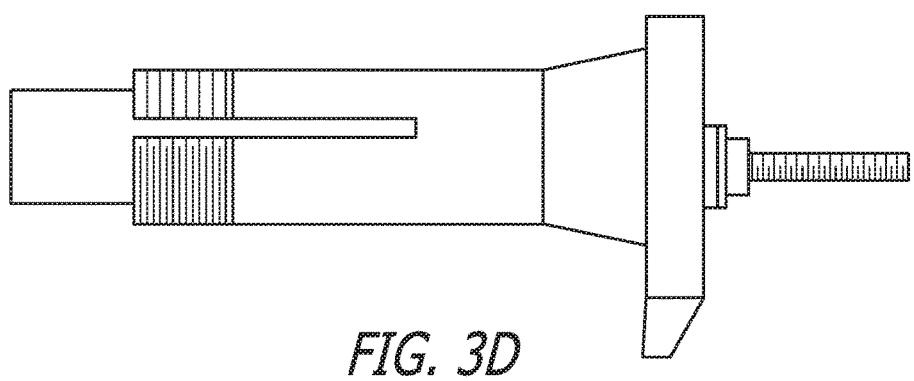

FIG. 3D illustrates how the cast cylindrical cup-shaped part can be removed from the cylindrical plug using a threaded rod and collet. For example, in many instances, the solid body includes a tapped hole, such that a threaded rod and bolt can subsequently be used to nondestructively separate the cast part form the cylindrical plug. Notably, the nondestructive extraction process can be significant insofar as it enables solid bodies to be reused, e.g. in the fabrication of subsequent robust gearbox housings. This, in turn, can enable mass production of metallic glass-based gearbox housings.

Figure 3E:
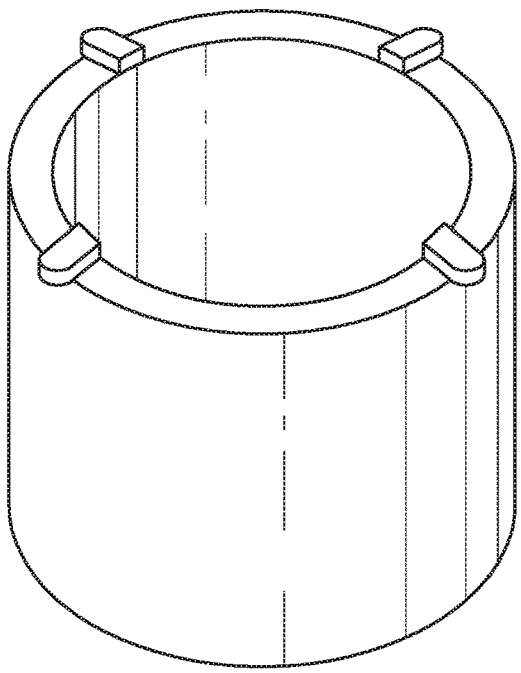
Figure 3F:
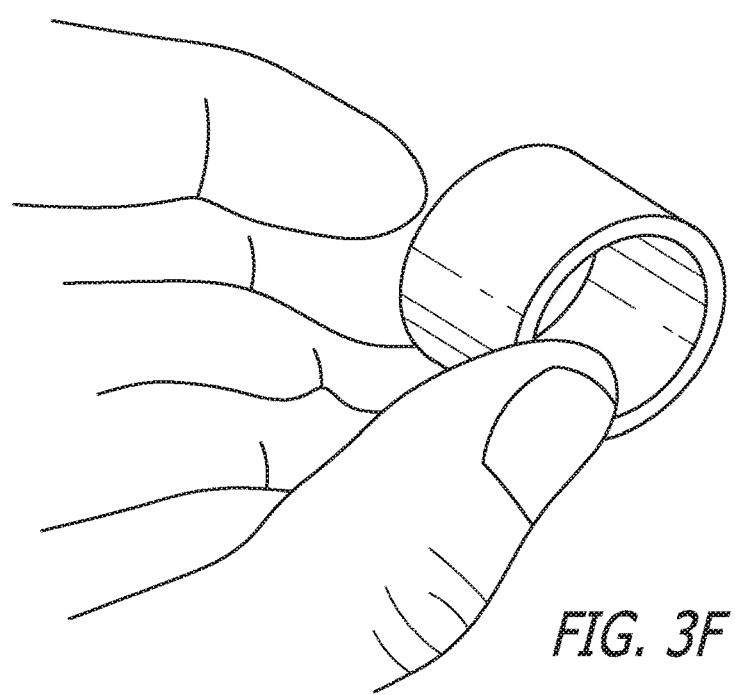

FIG. 3E illustrates a perspective view of the cast cup-shaped cylindrical part. Notably, FIG. 3F illustrates that similar techniques can be used to fabricate hollow tubes. For example, to derive a hollow tube, the 'bottom end' of the cup-shaped part (e.g. that seen in FIG. 3E) can be excised to result in the hollow tube geometry. In some instances, the alloy composition is cast in a manner that inherently results in the hollow tube, i.e. as opposed to a cup-shaped geometry. While cup-shaped geometries and hollow tubes are depicted, it should be reiterated that the above-described techniques can be used to create any of a variety of geometries characterized by the inclusion of a cavity, which can thereby enable them to viably serve as gearbox housings.

Figure 3G:
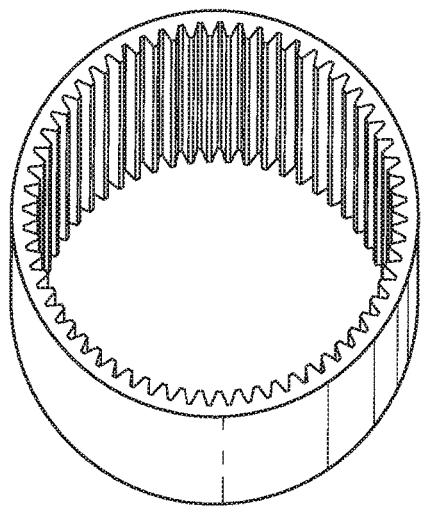
Figure 3H:
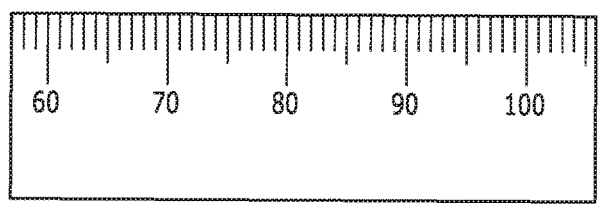
Figure 3H:
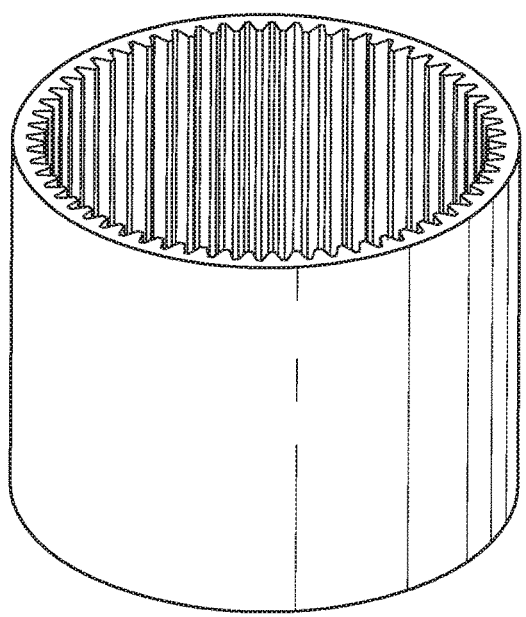

FIG. 3G illustrates an overhead view of the cast gearbox housing, and FIG. 3H illustrates an isometric view of the cast gearbox housing. More specifically, FIGS. 3G-3H illustrate cast part including teeth that were machined using wire electron discharge machining techniques. Of course, while a particular machining technique was implemented in this instance, it should be clear that any suitable post-cast processing technique can be used to implement the desired gear teeth in accordance with embodiments of the invention. Note that the described techniques can be used to implement gearbox housings characterized by a homogenous material composition throughout. As can be appreciated, this seamless design can provide numerous structural benefits.

While the above descriptions, including examples, have regarded the fabrication of robust metallic glass-based gearbox housings that utilize post-cast processing techniques to implement gear teeth, in many embodiments, the gearbox housing is net-shape cast to include the desired gear teeth. In this way, the separate implementation of gear teeth can be avoided.

Figure 4:
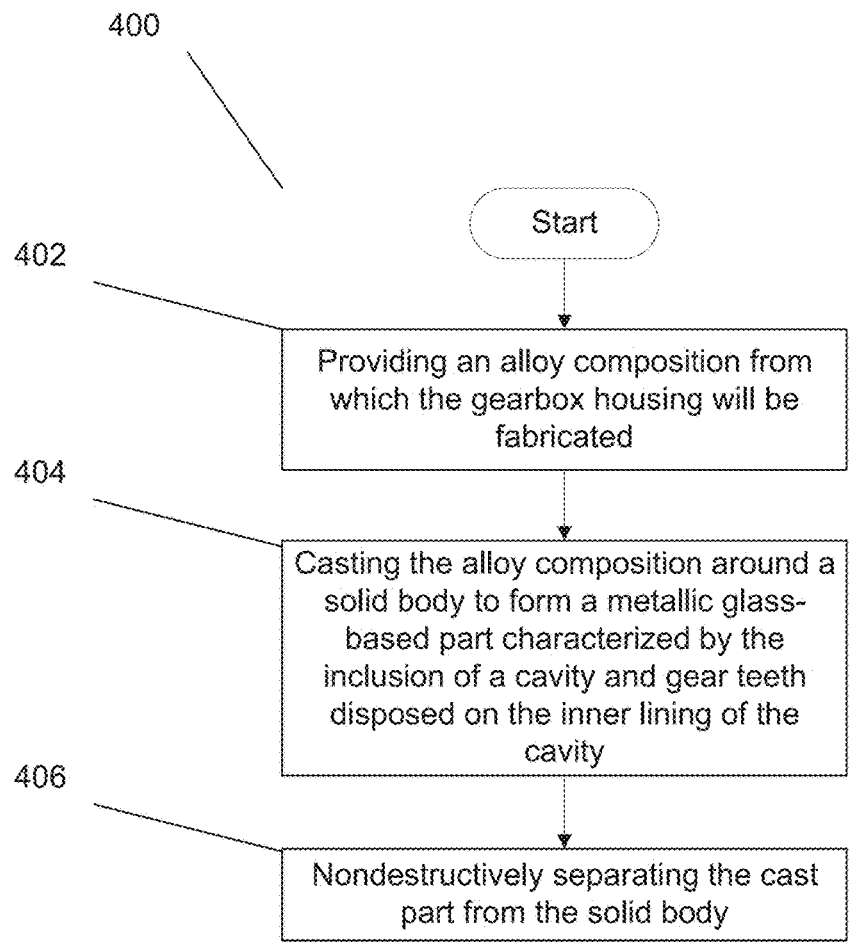
FIG. 4 illustrates a method of net shape casting a gearbox housing in accordance with certain embodiments of the invention.

Thus, for example, FIG. 4 illustrates a method of fabricating a robust gearbox housing using a net-shape casting technique in accordance with certain embodiments of the invention. In particular, the method 400 includes providing 402 an alloy composition from which the gearbox housing will be fabricated. As before, the depicted technique is generalized and any suitable metallic glass-based material can be implemented for the fabrication of the gearbox housing in accordance with embodiments of the invention. Thus, for instance, the metallic glass-based material selected can be based on the anticipated operating condition for the particular gearbox housing to be fabricated.

The method 400 further includes casting 404 the alloy composition around a solid body form a metallic glass-based gearbox housing characterized by its inclusion of a cavity and gear teeth disposed on the inner lining of the cavity. For example, the solid body around which the metallic glass-based material is cast can be characterized by a geometry that results in the casting of the gear teeth. As before, the casting of the alloy composition can be implemented in any of a variety of ways in accordance with embodiments of the invention, including those mentioned previously. As can be appreciated, having the solid body be shaped so as to define the gear teeth of the cast part can be advantageous insofar as having to separately implement gear teeth post-casting can be avoided.

As before, the method 400 further includes nondestructively separating 406 the cast part from the solid body. Also as before, any suitable technique can be used to achieve the nondestructive separation, including relying on the different effects on geometry as between the cast part and the solid body.

Figure 5A:
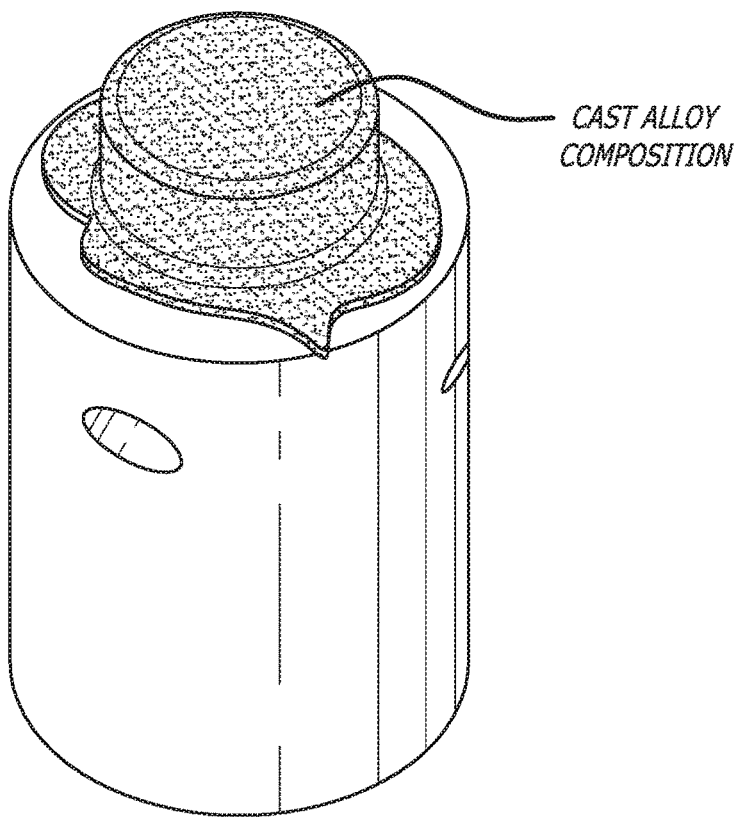
FIGS. 5A-5F illustrate net shape casting a gearbox housing in accordance with certain embodiments of the invention.
Figure 5B:
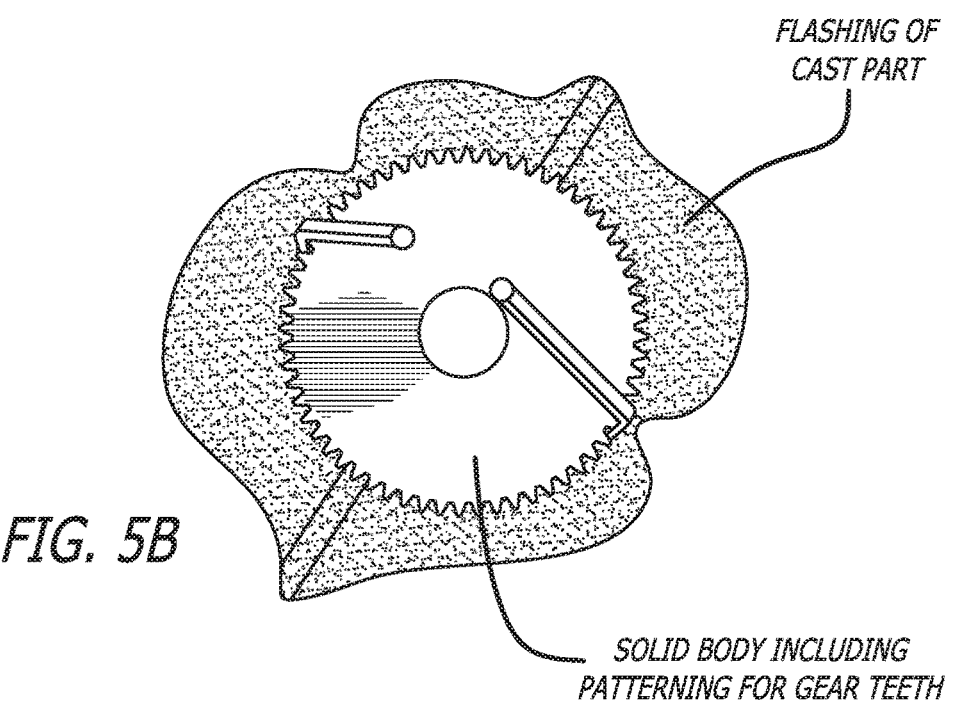

FIGS. 5A-5F illustrate an example of manufacturing a robust gearbox housing in accordance with the method outlined in FIG. 4 in accordance with an embodiment of the invention. In particular, FIG. 5A illustrates the provided alloy composition being cast around the solid body. More specifically, the alloy composition is a Ti—Zr—Cu—Be alloy composition. FIG. 5B further illustrates the solid body and the associated cast alloy composition. Note that the solid body includes patterning that can enable the implementation of the desired gear teeth. The flashing of the cast alloy composition is also depicted.

Figure 5C:
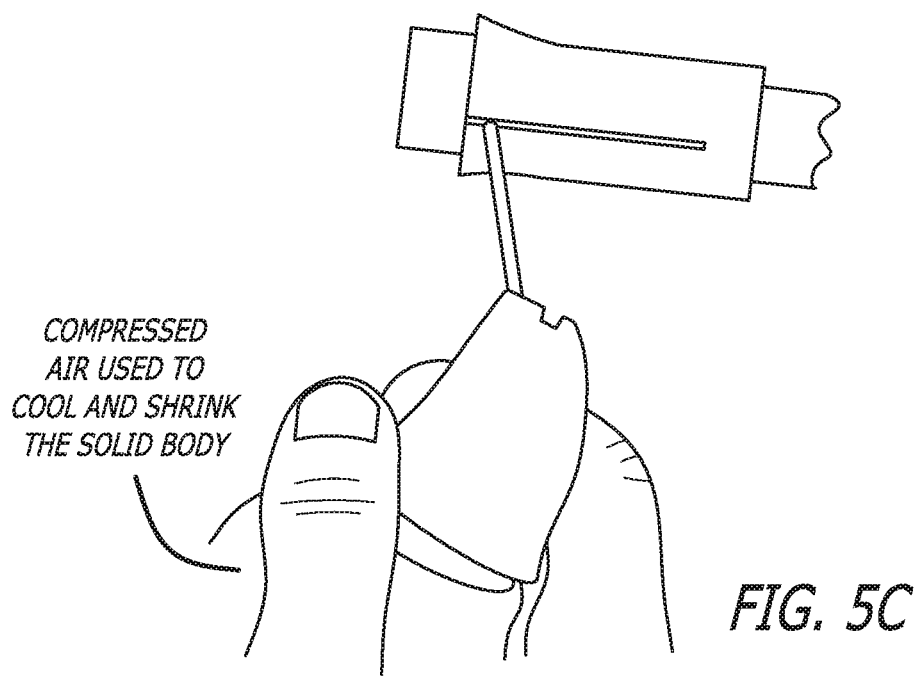

FIG. 5C illustrates that in the instant case, compressed gas was used to cool and shrink the solid body, which can enable the cast material to be more easily removed. As metallic glass-based materials are not as reactive to temperature changes, the cast material does not also shrink to the same extent, and this feature allows it to be more easily nondestructively separated from the solid body.

Figure 5D:
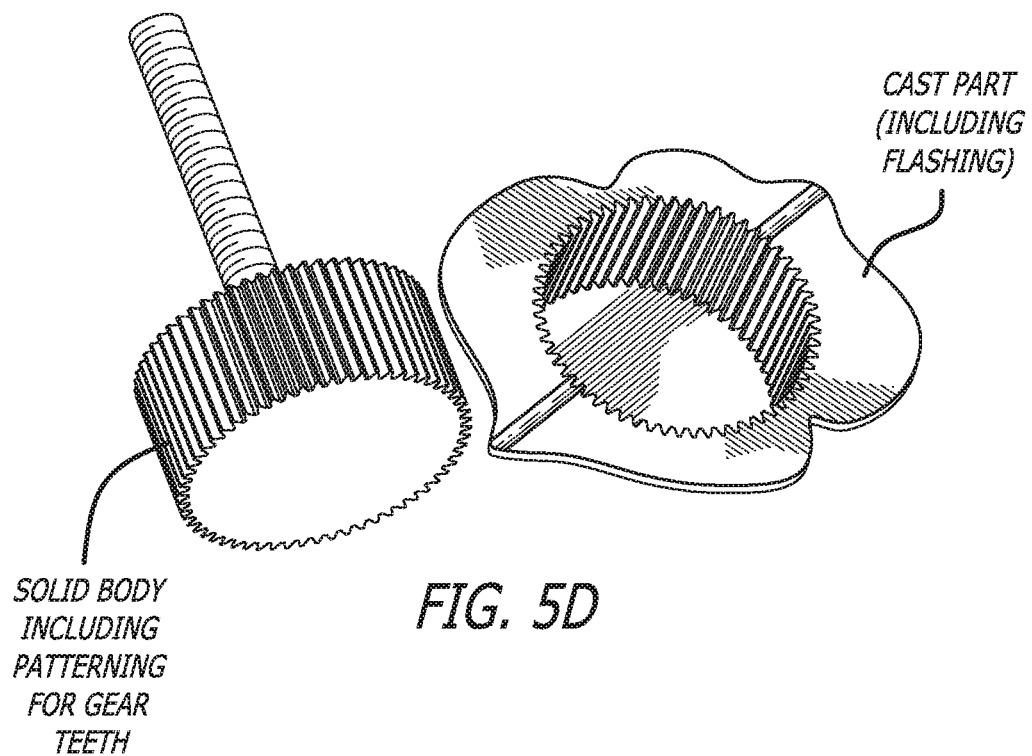
Figure 5E:
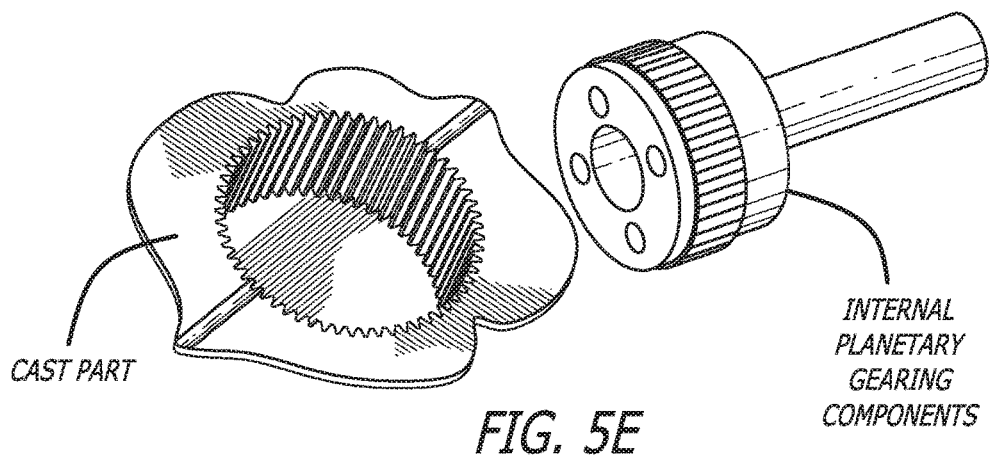
Figure 5F:
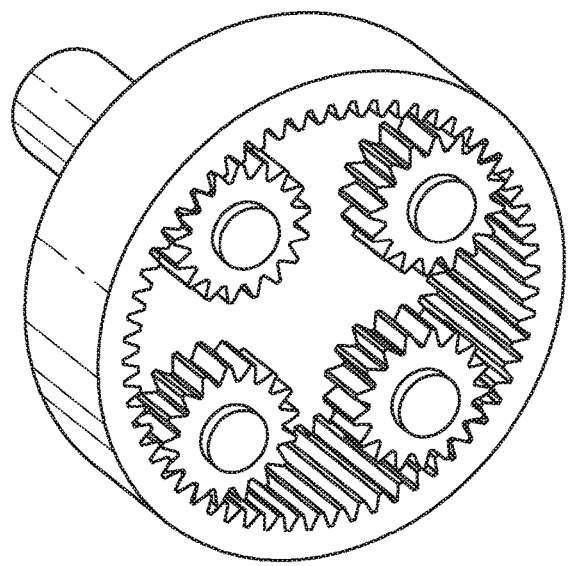

FIG. 5D illustrates the cast alloy composition, including flashing, separated from the solid body. FIG. 5E illustrates the cast alloy composition in relation to the remainder of the planetary gearing components, and FIG. 5F shows the assembled planetary gearing system, with the flashing removed.

While methodologies for manufacturing robust gearbox housings have been discussed in detail, many embodiments of the invention are directed to the metallic glass-based gearbox housings themselves. For example, in many embodiments, gearbox housings are implemented that are characterized by the inclusion of a metallic glass-based material. Any suitable metallic glass-based material can be implemented, including any of those previously mentioned and any of those in any of the above-cited disclosures. In many embodiments, the gearbox housings include gear teeth that can allow them to function as annular rings of a planetary gearing system. In numerous embodiments, gearbox housings are characterized in that their structure is largely homogenous in composition.

Additionally, while the instant application is directed to the manufacture of robust gearbox housings, it can be appreciated that the described manufacturing methodologies can be extended in a variety of applications. Thus, in many embodiments, alloy compositions are cast around solid bodies to fabricate any of a variety of useful objects made from metallic glass-based materials (e.g. tubing). From the above, it can be appreciated that the unique solidification shrinkage and thermal expansion properties can enable the casting (and associated nondestructive extraction) of metallic glass-based materials around solid bodies. In general, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of manufacturing a gearbox housing comprising: selecting an alloy composition from which the gearbox housing will be fabricated, wherein the alloy composition is configured to form, when cast, a metallic glass-based material characterized by:
    a Young's modulus of less than 110 GPa,
    a fracture toughness of between 20 MPa m$^{1/2}$ and approximately 200 MPa m$^{1/2}$,
    a Rockwell C hardness of greater than 45,
    an elastic limit of greater than 1%, and
    a solidification shrinkage of less than 1.5;
    casting the alloy composition around a solid body so as to form a cast part formed of the metallic glass-based material and characterized by a cavity disposed therein and defined by an outer contour of the solid body;
    wherein the cast part is further characterized by a plurality of gear teeth disposed about an inner lining of the cavity;
    and
    nondestructively separating the cast part from the solid body.

2. The method of claim 1, further comprising implementing gear teeth onto the lining of the cavity.

3. The method of claim 2, wherein the implementing of gear teeth is achieved via machining.

4. The method of claim 3, wherein the machining is achieved via electron discharge machining.

5. The method of claim 1, wherein the alloy composition is based on one of: Ti, Zr, Cu, Ni, Fe, Pd, Pt, Ag, Au, Al, Hf, W, Be, and combinations thereof.

6. The method of claim 5, wherein the alloy composition is based on Titanium.

7. The method of claim 1, wherein the metallic glass-based material is disposed throughout the cast part.

8. The method of claim 1, wherein the solid body is cylindrical.

9. The method of claim 1, wherein the solid body comprises a crystalline metal.

10. The method of claim 9, wherein the solid body is entirely comprised of the crystalline metal.

11. The method of claim 9, wherein the crystalline metal is brass.

12. The method of claim 1, wherein the cast part is cup-shaped.

13. The method of claim 1, wherein the cast part is characterized by a density of less than 5.5 g/cm$^3$.

* * * * *